(12) United States Patent
Umemoto et al.

(10) Patent No.: US 7,876,549 B2
(45) Date of Patent: Jan. 25, 2011

(54) SOLID ELECTROLYTIC CAPACITOR AND METHOD OF MANUFACTURING THE SAME

(75) Inventors: Takashi Umemoto, Moriguchi (JP); Hiroshi Nonoue, Moriguchi (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 333 days.

(21) Appl. No.: 12/118,783

(22) Filed: May 12, 2008

(65) Prior Publication Data

US 2008/0297982 A1 Dec. 4, 2008

(30) Foreign Application Priority Data

May 30, 2007 (JP) ............... 2007-142707

(51) Int. Cl.
*H01G 9/04* (2006.01)
*H01G 9/145* (2006.01)
*H01G 9/00* (2006.01)

(52) U.S. Cl. ............... 361/524; 361/528; 29/25.03

(58) Field of Classification Search ......... 361/523–529; 29/25.03

See application file for complete search history.

(56) References Cited

U.S. PATENT DOCUMENTS

2007/0285876 A1* 12/2007 Takatani et al. ............ 361/524

FOREIGN PATENT DOCUMENTS

| JP | 03228305 A | * | 10/1991 |
| JP | 03285322 A | * | 12/1991 |
| JP | 04025009 A | * | 1/1992 |
| JP | 04-048710 A1 | | 2/1992 |
| JP | 2000-188241 A1 | | 7/2000 |
| JP | 2004-071676 A1 | | 3/2004 |
| JP | 2005-252224 A1 | | 9/2005 |
| JP | 2005259759 A | * | 9/2005 |

* cited by examiner

*Primary Examiner*—Eric Thomas
(74) *Attorney, Agent, or Firm*—Marvin A. Motsenbocker; Mots Law, PLLC

(57) ABSTRACT

One aspect of the embodiment provides a solid electrolytic capacitor that comprises: an anode; a dielectric layer formed on the surface of this anode; an electrically-conductive polymer layer formed on the dielectric layer; and a cathode layer formed on this electrically-conductive polymer layer. At least manganese is contained in the dielectric layer, and the manganese distributes in a way that the manganese is present more in a part of the dielectric layer that is closer to the cathode (or in the interface between the dielectric layer and the electrically-conductive polymer layer).

6 Claims, 2 Drawing Sheets

SOLID ELECTROLYTIC CAPACITOR AND METHOD OF MANUFACTURING THE SAME

CROSS REFERENCE TO RELATED APPLICATIONS

This application claims priority based on 35 USC 119 from prior Japanese Patent Application No. P2007-142707 filed on May 30, 2007, the entire contents of which are incorporated herein by reference.

BACKGROUND OF THE INVENTION

1. Field of the Invention

The present invention relates to a solid electrolytic capacitor and a method of manufacturing the same.

2. Description of Related Art

In general, a solid electrolytic capacitor is formed in the following manner. Firstly, an anode made of a valve metal such as niobium (Nb) and tantalum (Ta) is anodized, so that a dielectric layer chiefly made of an oxide is formed on the surface of the anode. Subsequently, an electrolytic layer is formed on this dielectric layer, and lastly, a cathode layer is formed on the electrolytic layer. For example, Japanese Patent Application Laid-Open Publication No. Hei. 4-48710 discloses the structure of the electrolytic layer, which is formed by laminating a second electrically-conductive polymer layer made of polypyrrole formed through electrolytic polymerization to a first electrically-conductive polymer layer made of polypyrrole formed through chemical polymerization.

However, this type of solid electrolytic capacitor has a problem that the dielectric layer and the electrolytic layer delaminate in the interface between the two layers, and that the delamination decreases the electrostatic capacitance of the solid electrolytic capacitor. When the solid electrolytic capacitor is thermally treated particularly in a high-temperature test and in a reflow step carried out when parts are packaged on a board, the delamination in the interface is more serious. This delamination further decreases (deteriorates) the electrostatic capacitance of the solid electrolytic capacitor. For this reason, it has been recently strongly urged that these types of characteristics of the solid electrolytic capacitor should be improved.

SUMMARY OF THE INVENTION

An aspect of the invention provides a solid electrolytic capacitor that comprises a dielectric layer provided between an anode and a cathode, which contacts an electrically-conductive polymer layer, the capacitor wherein the dielectric layer contains manganese, and the manganese is present more in a part of the dielectric layer that is closer to the electrically-conductive polymer layer. In this respect, "the manganese is present more in a part of the dielectric layer that is closer to the electrically-conductive polymer layer" means that an area where the manganese concentration is at its maximum (or takes on a maximum value) throughout its distribution in the thickness direction of the dielectric layer is located in a part of the dielectric layer that is closer to the electrically-conductive polymer layer. In addition, the electrically-conductive polymer layer and the dielectric layer do not have to be in contact with each other through all of the areas inside the solid electrolytic capacitor. It suffices that the dielectric layer contains the manganese at least throughout an area where the dielectric layer contacts the electrically-conductive polymer layer, or in a part of the area, and that the manganese is present more in the part of the dielectric layer that is closer to the electrically-conductive polymer layer.

Another aspect of the invention provides a method of manufacturing a solid electrolytic capacitor, which comprises: forming a dielectric layer by oxidizing the surface of an anode; forming an electrically-conductive layer on the dielectric layer; and introducing the manganese to the surface of the dielectric layer that is closer to the electrically-conductive polymer layer.

The present invention provides a solid electrolytic capacitor that is capable of keeping its electrostatic capacitance from deteriorating, and a method of manufacturing the solid electrolytic capacitor.

DETAILED DESCRIPTION OF THE EMBODIMENT

Descriptions will be provided hereinbelow for the embodiment on a basis of the drawings. All of the drawings are provided for the purpose of illustrating the respective examples only. No dimensional proportion in the drawings shall impose a restriction on the drawings. For this reason, specific dimensions and the like should be interpreted by with the following descriptions taken into consideration. In addition, the drawings include parts whose dimensional relationship and ratio are different from one drawing to another.

Which preposition of on, over and above should be used is determined, for example, depending on where a surface of a layer in discussion is located relative to a surface of its corresponding layer, and has nothing to do with which direction a surface of a layer in discussion faces in the space. In the description and claims of the present invention, in some cases, the preposition "above" may be used for the purpose of describing a locational relationship between one layer and another layer even though the two layers are in partial contact with each other. Furthermore, in some cases, the preposition "on" may be used for the purpose of describing a locational relationship between one layer and another layer even though the two layers are not in contact with each other, for example, even so a different layer interposes between the two layers.

Figure 1:
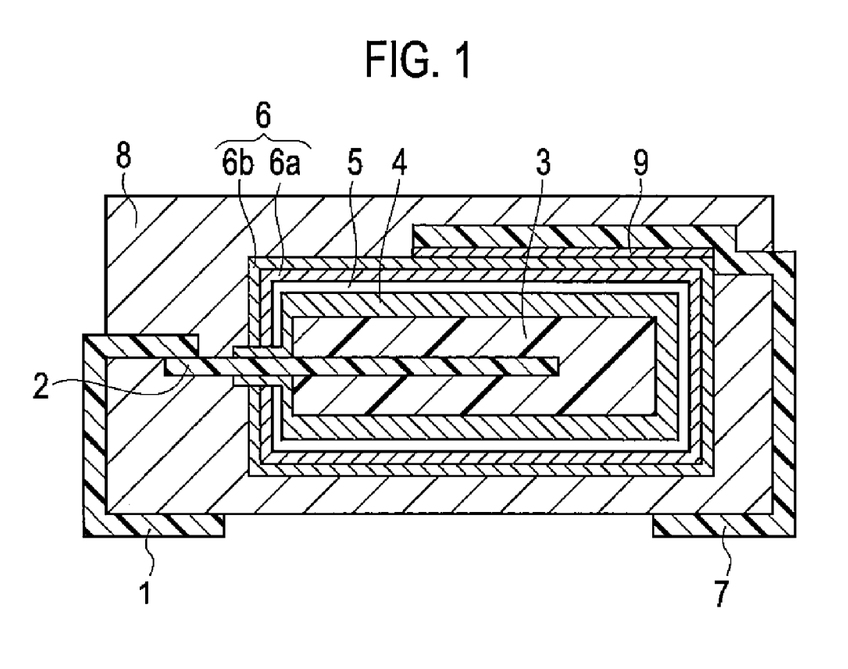
FIG. 1 is a cross-sectional view schematically showing a configuration of a solid electrolytic capacitor according to an embodiment.

FIG. 1 is a cross-sectional view schematically showing a configuration of a solid electrolytic capacitor according to an embodiment. The solid electrolytic capacitor according to the embodiment includes: anode body 3; dielectric layer 4 formed on the surface of anode body 3; electrically-conductive polymer layer 5 formed in dielectric layer 4; and cathode layer 6 formed on electrically-conductive polymer layer 5.

Anode body 3 is formed of porous sintered body of metal particles of a valve metal. A part of anode lead 2 made of a valve metal is embedded inside anode body 3. In this respect, the valve metal constituting anode lead 2 and anode body 3 is a metal material that can form an insulating oxide film. For example, niobium (Nb), tantalum (Ta) and the like are adopted as the metal material for anode lead 2 and anode body 3. In addition, an alloy of the afore-mentioned valve metals may be adopted as the metal material. Anode lead 2 and anode body 3 of these types constitute the anode.

Dielectric layer 4 is formed of a dielectric made of an oxide of a valve metal. Dielectric layer 4 is provided on the surfaces respectively of anode lead 2 and anode body 3. In a case where, for example, the valve metal is a niobium metal, dielectric layer 4 is formed of niobium oxide ($Nb_2O_5$). In addition, in the case of the embodiment, manganese (Mn) and fluorine (F) are contained in dielectric layer 4. The manganese is present more in a part of dielectric layer 4 that is closer to the cathode, whereas the fluorine is present more in another part of dielectric layer 4 that is closer to the anode. In this respect, to put it specifically, each of the manganese and the fluorine has a distribution of its own concentration in a thickness direction of dielectric layer 4 (a direction from the part of dielectric layer 4 that is closer to the cathode to the part of dielectric layer 4 that is closer to the anode). The manganese concentration is at its maximum in the interface between dielectric layer 4 and electrically-conductive polymer layer 5, whereas the fluorine concentration is at its maximum in the interface between dielectric layer 4 and anode body 3.

Electrically-conductive polymer layer 5 functions as an electrolytic layer, and is provided on the surface of dielectric layer 4. No specific restriction is imposed on the material for electrically-conductive polymer layer 5, as long as the material is an electrically-conductive polymer material. Polypyrrole, polyaniline, polythiophene and the like are adopted as the material because of their excellent electrical conductivity.

Cathode layer 6 is formed of laminated films, one of which is carbon layer 6a including carbon particles, and the other of which is silver-paste layer 6b including silver particles. Cathode layer 6 is provided on electrically-conductive polymer layer 5. Cathode layer 6 and electrically-conductive polymer layer 5 of these types constitute the cathode.

In this embodiment, cathode terminal 7, which is plate-shaped, is connected onto cathode layer 6 with electrically-conductive adhesive 9 interposed in between. Anode terminal 1, which is plate-shaped, is connected to anode lead 2. Molded outer package 8 made of an epoxy resin or the like is formed in a way that, as shown in FIG. 1, parts respectively of anode terminal 1 and cathode terminal 7 are drawn out to the outside. An electrically-conductive material such as nickel (Ni) can be used as the material for anode terminal 1 and cathode terminal 7. End portions respectively of anode terminal 1 and cathode terminal 7, which are exposed to the outside of molded outer package 8 are folded back, and function as the terminals of the solid electrolytic capacitor.

It should be noted that anode body 3, dielectric layer 4 and electrically-conductive polymer layer 5 are examples of "anode," "dielectric layer," and "electrically-conductive polymer layer," respectively.

(Manufacturing Method)

Next, descriptions will be provided for a method of manufacturing a solid electrolytic capacitor according to the embodiment, which is shown in FIG. 1.

(Step 1)

A molded body made of particles of the niobium (Nb), which is molded in a way that the part of anode lead 2 is embedded in the molded body, is sintered around anode lead 2 in a vacuum. Thereby, anode body 3 is formed from the porous sintered body. At this time, particles of the niobium are welded together.

(Step 2)

Anode body 3 is anodized in an ammonium fluoride aqueous solution. Subsequently, the resultant anode body is anodized in the phosphoric acid aqueous solution. Thereby, dielectric layer 4 made of the niobium oxide is formed in a way that dielectric layer 4 covers the periphery of anode body 3. At this time, the fluorine is taken into dielectric layer 4, and the fluorine distributes in a way that the fluorine is present more in the part of dielectric layer 4 that is closer to the anode (or in the interface between dielectric layer 4 and anode body 3).

(Step 3)

Anode body 3 on which dielectric layer 4 is formed is steeped in a manganese nitrate aqueous solution, and subsequently the resultant anode body is thermally treated. Thereby, a manganese dioxide layer is formed on the surface of dielectric layer 4. At this time, the manganese (Mn) is taken into dielectric layer 4, and the manganese distributes in a way that the manganese is present more in a vicinity of the surface of dielectric layer 4 (or in the interface between dielectric layer 4 and the manganese dioxide layer).

(Step 4)

Anode body 3 on which the manganese dioxide layer is formed is steeped in a sulfuric acid aqueous solution. Thereby, the manganese dioxide layer on the surface of dielectric layer 4 is removed therefrom. By this, dielectric layer 4 containing the manganese, which is taken into the vicinity of the surface of dielectric layer 4 is formed.

(Step 5)

As the electrolytic layer, electrically-conductive polymer layer 5 made of polypyrrole is formed on the surface of dielectric layer 4 by chemical polymerization or the like. In the case of chemical polymerization, for example, electrically-conductive polymer layer 5 is formed by performing an oxidative polymerization on a monomer by use of an oxidant. More specifically, dielectric layer 4 is formed on the surface of anode body 3, and the resultant anode body is steeped in an oxidant solution, and thereby the oxidant is adhered onto dielectric layer 4. Subsequently, dielectric layer 4 onto which the oxidant is adhered is steeped in a monomer solution, or is left as it is in an atmosphere in which the monomer is evaporated. In this manner, the monomer is polymerized on dielectric layer 4, and electrically-conductive polymer layer 5 is thus formed.

(Step 6)

A carbon paste is applied onto electrically-conductive polymer layer 5, and the carbon paste is dried thereon. Thereby, carbon layer 6a is formed. Subsequently, a silver paste is applied onto carbon layer 6a, and the silver paste is dried thereon. Thereby, silver-paste layer 6b is formed. By these, cathode layer 6 made of the laminated films, one of which is carbon layer 6a, and the other of which is silver-paste layer 6b, is formed on electrically-conductive layer 5.

(Step 7)

After electrically-conductive adhesive 9 is applied onto cathode terminal 7, electrically-conductive adhesive 9 is dried with cathode layer 6 and cathode terminal 7 being in contact with each other with electrically-conductive adhesive 9 being interposed in between. Thereby, cathode layer 6 and cathode terminal 7 are connected to each other. In addition, anode terminal 1, which is plate-shaped, is connected onto anode lead 2 by spot welding.

(Step 8)

Molded outer package 8 made of epoxy resin is formed around the resultant product by transfer molding. At this time, molded outer package 8 is formed by causing anode lead 2, anode body 3, dielectric layer 4, electrically-conductive polymer layer 5 and cathode layer 6 to be accommodated inside molded outer package 8, and concurrently by drawing out the end portions respectively of cathode terminal 7 and anode terminal 1 to the outside of molded outer package 8 (in the respective opposite directions).

(Step 9)

Extremity portions respectively of anode terminal 1 and cathode terminal 7, which is exposed to the outside of molded outer package 8 are folded downward, and are arranged along the bottom surface of molded outer package 8. The extremity portions respectively of the two terminals function as the terminals of the solid electrolytic capacitor, and are used to electrically connect the solid electrolytic capacitor to a package board.

Through the foregoing steps, the solid electrolytic capacitor according to the embodiment is manufactured.

For each of the following examples and comparative examples, a solid electrolytic capacitor in which the cathode layer and the preceding layers are formed is produced, and thereafter the characteristics of the solid electrolytic capacitor thus produced are evaluated.

Example 1

For Example 1, solid electrolytic capacitor A is produced through steps corresponding to the respective steps that are carried out in the foregoing manufacturing method.

(Step 1A)

Particles of metal niobium with a primary particle size of approximately 500 nm are molded in a way that a part of anode lead 2 is embedded in the metal particles, and a resultant molded body is sintered in vacuum. Thereby, anode body 3 made of a niobium porous sintered body with a height of approximately 4.4 mm, a width of approximately 3.3 mm and a depth of approximately 1.0 mm is formed.

(Step 2A)

Anode body 3 thus sintered is anodized in an aqueous solution containing approximately 0.1% by weight of ammonium fluoride, which is kept at approximately 40° C., with a constant voltage of approximately 10V being applied to anode body 3 for approximately 10 hours. Subsequently, the resultant anode body is anodized in an aqueous solution containing approximately 0.5% by weight of phosphorous acid, which is kept at approximately 60° C., with a constant voltage of approximately 10V being applied to the resultant anode body for approximately two hours. Thereby, dielectric layer 4 made of the niobium oxide, which contains the fluorine, is formed in a way that dielectric layer 4 covers the periphery of anode body 3. At this time, the fluorine has a concentration distribution in the thickness direction of dielectric layer 4, and the fluorine concentration is at its maximum in the interface between dielectric layer 4 and anode body 3.

(Step 3A)

Anode body 3 on which dielectric layer 4 is formed is steeped in an aqueous solution containing approximately 30% by weight of the manganese nitrate for approximately 5 minutes. Subsequently, the resultant anode body is thermally treated at 170° C. for 30 minutes. Thereby, a manganese dioxide layer is formed on the surface of dielectric layer 4. At this time, the manganese is introduced into the inside of dielectric layer 4.

(Step 4A)

Anode body 3 above which the manganese dioxide is formed is steeped in an aqueous solution containing approximately 5% by weight of sulfuric acid for 10 minutes. Thereby, the manganese dioxide on the surface of dielectric layer 4 is removed therefrom. By this, dielectric layer 4 including the manganese which is introduced into a vicinity of its surface is formed. At this time, the manganese concentration is at its maximum in the surface of dielectric layer 4.

(Step 5A)

Anode body 3 on which dielectric layer 4 is formed is steeped in an oxidant solution, and thereby the oxidant is adhered onto dielectric layer 4. Subsequently, dielectric layer 4 onto which the oxidant is adhered is steeped in a pyrrole monomer solution, and the pyrrole monomer is polymerized on dielectric layer 4. Thereby, electrically-conductive polymer layer 5 made of polypyrrole is formed on dielectric layer 4.

(Step 6A)

A carbon paste is applied onto electrically-conductive polymer layer 5, and the carbon paste is dried thereon. Thereby, carbon layer 6a made of a layer containing carbon particles is formed. A silver paste is applied onto carbon layer 6a, and the silver paste is dried thereon. Thereby, silver-paste layer 6b made of a layer containing silver particles is formed. By these, cathode layer 6 made of a laminated layer, one of which is carbon layer 6a, and the other of which is silver-paste layer 6b, is formed on electrically-conductive polymer layer 5.

In the foregoing manner, solid electrolytic capacitor A according to Example 1 is produced.

Example 2

For Example 2, solid electrolytic capacitor B is produced in the same manner, and with the same conditions, as solid electrolytic capacitor A according to Example 1 is produced, except that particles of the niobium oxide with a primary particle size of approximately 500 nm is used instead of the particles of the niobium metal which is used in step 1A.

Example 3

For Example 3, solid electrolytic capacitor C is produced in the same manner, and with the same conditions, as solid electrolytic capacitor A according to Example 1 is produced, except that particles of the tantalum metal with a primary particle size of approximately 1000 nm is used instead of the particles of the niobium metal which is used in step 1A.

Comparative Example 1

For Comparative Example 1, solid electrolytic capacitor X1 is produced in the same manner, and with the same conditions, as solid electrolytic capacitor A according to Example 1 is produced, except that step 2A for the anodization in the ammonium fluoride aqueous solution, step 3A and step 4A are skipped over.

Comparative Example 2

For Comparative Example 2, solid electrolytic capacitor X2 is produced in the same manner, and with the same conditions, as solid electrolytic capacitor A according to Example 1 is produced, except that step 3A and step 4A are skipped over. It should be noted that solid electrolytic capacitor X2 according to Comparative Example 2 is a solid electrolytic capacitor of the conventional type.

Comparative Example 3

For Comparative Example 3, solid electrolytic capacitor X3 is produced in the same manner, and with the same conditions, as solid electrolytic capacitor A according to Example 1 is produced, except that step 2A for the anodization in the ammonium fluoride aqueous solution is skipped over.

Comparative Example 4

For Comparative Example 4, solid electrolytic capacitor X4 is produced in the same manner, and with the same conditions, as solid electrolytic capacitor A according to Example 1 is produced, except that particles of the tantalum metal with a primary particle size of approximately 1000 nm are used instead of the particles of the niobium metal which are used in step 1A, and concurrently except that step 2A for the anodization in the ammonium fluoride aqueous solution, step 3A and step 4A are skipped over.

(Evaluation)

Figure 2:
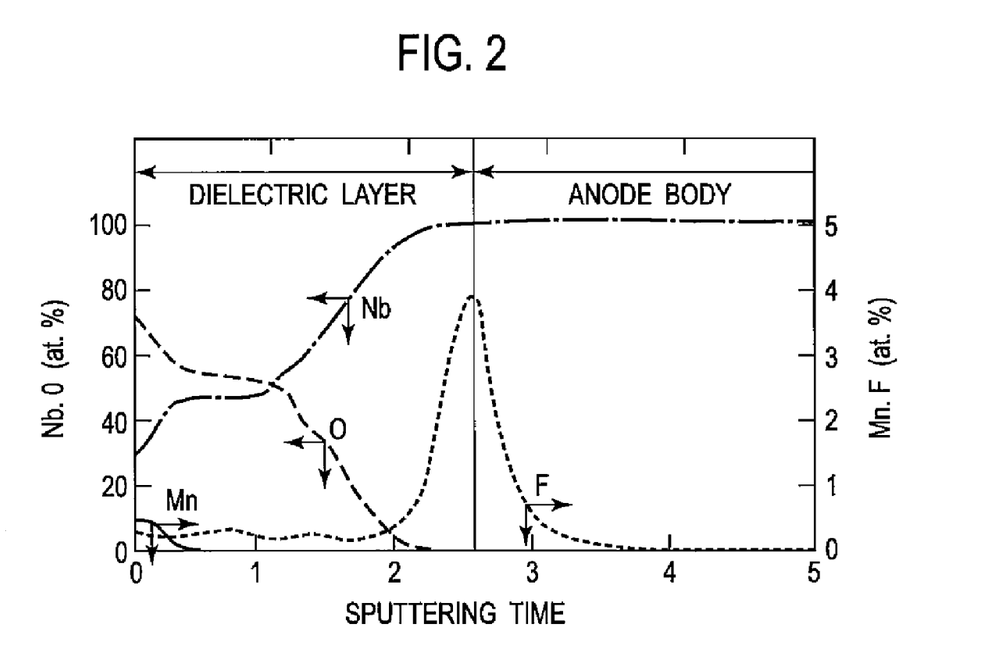
FIG. 2 is a graph showing a result of measuring a solid electrolytic capacitor according to Example 1 by ESCA (electron spectroscopy for chemical analysis).

First, the composition of solid electrolytic capacitor A according to Example 1 is analyzed. FIG. 2 is a graph showing a result of measuring solid electrolytic capacitor A by ESCA (electron spectroscopy for chemical analysis). It should be noted that a sample in which neither electrically-conductive polymer layer 5 nor cathode layer 6 is formed is used for the measurement. In FIG. 2, ordinate indicates a measurement of the content of each element in the solid electrolytic capacitor, and abscissa indicates sputtering time. The lapse of sputtering time corresponds to the location of sputtering in the thickness direction of the solid electrolytic capacitor. The sputtering depth for each minute of sputtering is approximately 10 nm.

As shown in FIG. 2, dielectric layer 4 in solid electrolytic capacitor A according to Example 1 is made of niobium oxide that essentially contains niobium (Nb) and oxygen (O). In addition, dielectric layer 4 contains manganese (Mn) and the fluorine (F). The manganese is present more in a vicinity of a surface of dielectric layer 4 that is closer to the cathode. The manganese distributes with a concentration gradient in which the manganese concentration gets higher toward the vicinity of the surface of the dielectric layer that is closer to the cathode. The manganese content in the dielectric layer is approximately 0.05 atomic %. On the other hand, the fluorine is present more in a vicinity of the other surface of the dielectric layer that is closer to the anode (or in the interface between dielectric layer 4 and anode body 3). The fluorine distributes with a concentration gradient in which the fluorine concentration gets higher toward the vicinity of the surface of dielectric layer that is closer to the anode. The fluorine content in the dielectric layer is approximately 0.95 atomic %. Incidentally, one may consider that the fluorine in anode body 3 diffuses from the dielectric layer 4. It should be noted that, in the case of the embodiment, the interface between the dielectric layer and the electrically-conductive polymer layer is defined as a location of the sputtering at a sputtering time of zero minute, as well as the interface between the dielectric layer and the anode body, which is defined as a location where the oxygen concentration becomes virtually equal to zero %.

In this respect, in the case of Example 1, dielectric layer 4 contains the fluorine whose concentration starts to get higher at a location which is approximately 5 nm deep from the interface between dielectric layer 4 and the anode body, and whose content becomes equal to approximately 4 atomic % at its maximum in the vicinity of the interface between dielectric layer 4 and the anode body. However, the fluorine content in the vicinity of the interface between dielectric layer 4 and the anode body is not necessarily limited to the approximately 4 atomic % at its maximum. It is desirable that the fluorine content there should be approximately 0.1 atomic % to approximately 10 atomic %. In addition, from a viewpoint of an effective check on oxygen diffusion in the dielectric layer and the dielectric layer's maintenance of its excellent dielectric characteristic, it is more desirable that the fluorine content therein should be approximately 1 atomic % to approximate 5 atomic %. Dielectric layer 4 contains the manganese whose concentration starts to get higher at a location which is approximately 5 nm deep from the interface between dielectric layer 4 and the cathode, and whose content is approximately 0.5 atomic % at its maximum in the vicinity of the interface between dielectric layer 4 and the cathode. However, the manganese content is not necessarily limited to approximately 0.5 atomic % at it maximum. It is desirable that the manganese content in the vicinity of the interface between dielectric layer 4 and the cathode should be approximately 0.1 atomic % to approximately 2 atomic %. Furthermore, from a viewpoint of the stable presence of oxygen in the vicinity of the surface of the dielectric layer that is closer to the cathode, and the dielectric layer's maintenance of its excellent dielectric characteristic, it is more desirable that the manganese content there should be approximately 0.2 atomic % to approximately 1 atomic %. In this respect, the vicinity of the interface is defined as an area that is located within ±δ from the interface, where δ represents a value equal to approximately 20% of the thickness of the dielectric layer.

Figure 3:
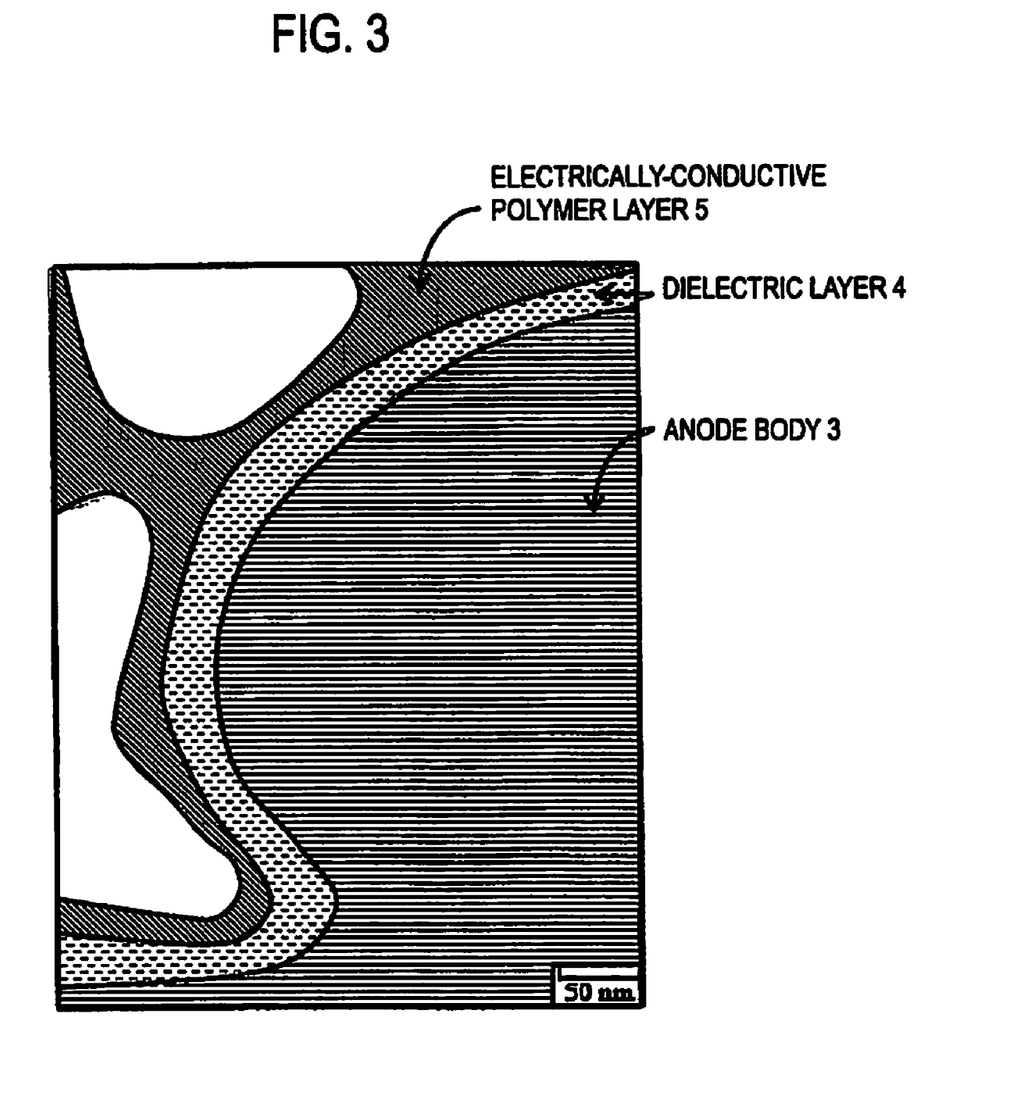
FIG. 3 is a cross-sectional TEM (transmission electron microscope) image of the solid electrolytic capacitor according to Example 1.

Subsequently, the condition of the surface of dielectric layer 4 of solid electrolytic capacitor A according to Example 1 is observed. FIG. 3 is a cross-sectional TEM (Transmission Electron Microscope) image of solid electrolytic capacitor A. As is clear from FIG. 3, no micro-pits (microscopic concave portions) or the like are observed in the surface of the dielectric layer that is closer to the cathode (or in the interface between dielectric layer 4 and electrically-conductive polymer layer 5). The surface of dielectric layer 4 that is closer to the cathode is finished uniformly smoothly. In addition, electrically-conductive polymer layer 5 is formed in a way that dielectric layer 4 is covered with electrically-conductive polymer layer 5 in a desirable condition.

Thereafter, for each of various types of solid electrolytic capacitors, the maintenance factor of electrostatic capacitance and the leakage current are evaluated. Table 1 shows a result of evaluating the maintenance factor of electrostatic capacitance and the leakage current of each niobium solid electrolytic capacitor. Table 2 shows a result of evaluating the maintenance factor of electrostatic capacitance and the leakage current of each tantalum solid electrostatic capacitor. It should be noted that, in Table 1, measured values representing the respective leakage currents are indexed by assigning an index of 100 to a result of measuring the leakage current of solid electrolytic capacitor X2 according to Comparative Example 2. Furthermore, it should be noted that, in Table 2, a measured value representing the leakage current of solid electrolytic capacitor C is indexed by assigning an index of 100 to a result of measuring the leakage current of solid electrolytic capacitor X4 according to Comparative Example 4.

The maintenance factor of electrostatic capacitance is calculated with the following Equation (1) by use of its electrostatic capacitances prior and subsequent to a high-temperature protracted test. It should be noted that the closer to 100 a value representing the maintenance factor is, the less the electrostatic capacitance decreases.

Maintenance Factor of Electrostatic Capacitance=
(Electrostatic Capacitance subsequent to High-temperature Protracted Test/Electrostatic Capacitance anterior to High-temperature Protracted Test)×100    EQUATION (1)

Conditions for measuring the electrostatic capacitances and the leakage current for each of the various types of solid electrolytic capacitors are as follows.

The electrostatic capacitances (the electrostatic capacitances of solid electrolytic capacitors at a 120-Hz frequency) of each of the various types of solid electrolytic capacitors are measured by use of a LCR meter after the capacitor is thermally treated at a maximum temperature of 260° C. for one minute (before the high-temperature protracted test), and after the capacitor is left in a temperature-controlled bath whose temperature is kept at 105° C. for 1000 hours as the high-temperature protracted test.

The leakage currents of each of the various types of solid electrolytic capacitors are measured 20 seconds after a voltage of 2.5V is applied to the capacitor, after the capacitor is thermally treated at a maximum temperature of 260° C. for one minute.

to the cathode, is better than that of Comparative Example 1 (solid electrolytic capacitor X1) including the conventional type of dielectric layer. The maintenance factor of electrostatic capacitance of Example 1 (solid electrolytic capacitor A) in which the fluorine is present more in the vicinity of the surface of the dielectric layer that is closer to the anode, is even better than that of Comparative Example 3 (solid electrolytic capacitor X3). In addition, the leakage current subsequent to the heat treatment is far smaller in Example 1 (solid electrolytic capacitor A) than in Comparative Example 3 (solid electrolytic capacitor X3). One may consider that the greater presence of the fluorine more in the vicinity of the surface of the dielectric layer that is closer to the anode, does not improve the maintenance factor of electrostatic capacitance, and that the fluorine augments the manganese effect of improving the maintenance factor of electrostatic capacitance.

TABLE 1

| | | MATERIAL FOR ANODE | DIELECTRIC LAYER | | MAINTENANCE FACTOR OF ELECTROSTATIC CAPACITANCE (%) | LEAKAGE CURRENT[1]) |
| | | | MANGANESE | FLUORINE | | |
|---|---|---|---|---|---|---|
| EXAMPLE 1 | SOLID ELECTROLYTIC CAPACITOR A | NIOBIUM | PRESENT | PRESENT | 93 | 98 |
| EXAMPLE 2 | SOLID ELECTROLYTIC CAPACITOR B | NIOBIUM OXIDE | PRESENT | PRESENT | 94 | 99 |
| COMPARATIVE EXAMPLE 1 | SOLID ELECTROLYTIC CAPACITOR X1 | NIOBIUM | ABSENT | ABSENT | 63 | 1200 |
| COMPARATIVE EXAMPLE 2 | SOLID ELECTROLYTIC CAPACITOR X2 | NIOBIUM | ABSENT | PRESENT | 58 | 100 |
| COMPARATIVE EXAMPLE 3 | SOLID ELECTROLYTIC CAPACITOR X3 | NIOBIUM | PRESENT | ABSENT | 89 | 1130 |

[1])Leakage currents are indexed by assigning an index of 100 to the leakage current of Comparative Example 2 (solid electrolytic capacitor X2).

As shown in Table 1, the maintenance factor of electrostatic capacitance of Comparative Example 3 (solid electrolytic capacitor X3) in which the manganese is present more in the vicinity of the surface of the dielectric layer that is closer In addition, Example 2 (solid electrolytic capacitor B), which uses the niobium oxide for the anode body brings about an effect similar to that of Example 1 (solid electrolytic capacitor A).

TABLE 2

| | | MATERIAL FOR ANODE | DIELECTRIC LAYER | | MAINTENANCE FACTOR OF ELECTROSTATIC CAPACITANCE (%) | LEAKAGE CURRENT[1]) |
| | | | MANGANESE | FLUORINE | | |
|---|---|---|---|---|---|---|
| EXAMPLE 3 | SOLID ELECTROLYTIC CAPACITOR C | TANTALUM | PRESENT | PRESENT | 95 | 75 |
| COMPARATIVE EXAMPLE 4 | SOLID ELECTROLYTIC CAPACITOR X4 | TANTALUM | ABSENT | ABSENT | 80 | 100 |

[1])The leakage current of Example 3 (solid electrolytic capacitor C) is indexed by assigning an index of 100 to the leakage current of Comparative Example 4 (solid electrolytic capacitor X4).

As shown in Table 2, unlike Comparative Example 4 (solid electrolytic capacitor X4) in which the tantalum is used for the anode body, Example 3 (solid electrolytic capacitor C) in which the manganese is designed to be present more in the vicinity of the surface of the dielectric layer that is closer to the cathode, and in which the fluorine is present more in the vicinity of the surface of the dielectric layer that is closer to the anode, brings about an effect similar to that which Example 1 (solid electrolytic capacitor A) brings about. From this fact, the use of the tantalum for the anode body brings about an effect similar to that which the use of the niobium for the anode body brings about.

The solid electrolytic capacitor and the method of manufacturing the solid electrolytic capacitor according to the embodiment are capable of bringing about the following effects.

(1) Oxygen is stably present in the vicinity of the surface of dielectric layer 4 that is closer to the cathode (or in the vicinity of the interface between dielectric layer 4 and electrically-conductive polymer layer 5), and thereby the condition of dielectric layer 4 in the vicinity thereof is stable against heat because the manganese is contained in dielectric layer 4 with the manganese being present more in the vicinity of the surface of dielectric layer 4 that is closer to the cathode. This makes it possible to check the delamination between dielectric layer 4 and electrically-conductive layer 5, and accordingly to decrease the deterioration of the electrostatic capacitance of the solid electrolytic capacitor.

That is because, in the case where the niobium oxide is used as the material for dielectric layer 4, even though the niobium oxide releases oxygen due to heat, part of oxygen bound to the manganese is supplied to the niobium oxide to compensate for the amount of oxygen thus released, and the number of oxygen atoms bound to the niobium in dielectric layer 4 is kept constant so that the niobium oxide is stabilized.

(2) It is possible to more effectively stabilize the condition in the vicinity of the surface of dielectric layer 4 that is closer to the cathode because the manganese in dielectric layer 4 is designed to be present more in the vicinity of the interface between dielectric layer 4 and electrically-conductive layer 5 (or in the vicinity of the surface of dielectric layer 4 that is closer to the cathode). In addition, because the manganese is not present so much inside the dielectric layer, it is possible to prevent the dielectric constant of the dielectric layer from decreasing. The above-described effect in (1) is more obviously secured.

(3) It is possible to far better stabilize the condition in the vicinity of the surface of dielectric layer 4 that is closer to the cathode because the manganese and fluoride are contained in dielectric layer 4 with fluoride being present more in the vicinity of the surface of dielectric layer 4 that is closer to the anode (or in the vicinity of the interface between the dielectric layer 4 and anode body 3). This makes it possible to check the delamination between dielectric layer 4 and electrically-conductive polymer layer 5, and accordingly to further inhibit the deterioration of the electrostatic capacitance of the solid electrolytic capacitor.

That is because, in the case where the niobium oxide is used as the material for dielectric layer 4, the confinement of fluorine in dielectric layer 4 with the fluorine being present more in the vicinity of the interface between dielectric layer 4 and anode body 3 (or in the vicinity of the surface of dielectric layer 4 that is closer to the anode) causes niobium fluoride to be formed in the vicinity of the interface between dielectric layer 4 and anode body 3. In other words, the area including the niobium fluoride in the vicinity of the interface between dielectric layer 4 and anode body 3 functions as an oxygen-blocking layer for checking oxygen from diffusing from dielectric layer 4 to anode body 3. As a result, oxygen is hard to decrease in dielectric layer 4. This causes oxygen to be stably present in the vicinity of the surface of dielectric layer 4 that is closer to the cathode (or in the vicinity of the interface between dielectric layer 4 and electrically-conductive polymer layer 5), and thus stabilizes the condition in the vicinity of the surface of dielectric layer 4 that is closer to the cathode against heat.

(4) Oxygen is checked from diffusing from dielectric layer 4 to anode body 3) because the fluorine is contained in dielectric layer 4 with the fluorine being present more in the vicinity of the surface of dielectric layer 4 that is closer to the anode (or in the vicinity of the interface between dielectric layer 4 and anode body 3. This makes it possible to further reduce the leakage current of the solid electrolytic capacitor. As a result, it is possible to realize a solid electrolytic capacitor that is capable of checking the electrostatic capacitance from deteriorating, and whose leakage current is reduced.

(5) It is possible to more obviously secure the above-described effects respectively in (3) and (4) because fluoride in dielectric layer 4 is designed to be present more in the vicinity of the interface between dielectric layer 4 and anode body 3 (or in the vicinity of the surface of dielectric layer 4 that is closer to the anode).

(6) The manufacturing method according to the embodiment makes it possible to manufacture a solid electrolytic capacitor in which the manganese is introduced to be present more in the vicinity of the surface of dielectric layer 4 that is closer to the cathode, and accordingly to easily realize a solid electrolytic capacitor, the deterioration of whose electrostatic capacitor is decreased. That is because the presence of the manganese in the vicinity of the surface of dielectric layer 4 that is closer to the cathode makes it possible to stabilize the condition in the vicinity of the surface of dielectric layer 4 that is closer to the cathode against heat. This makes it possible to check the delamination between dielectric layer 4 and electrically-conductive polymer layer 5, and accordingly to check the electrostatic capacitance of the solid electrolytic capacitor from deteriorating.

(7) In the case of the conventional type of dielectric layer, many micro-pits (or microscopic concave portions) are generated in the vicinity of its surface, and the electrically-conductive polymer layer does not enter the concave portions. These reduce the contact area between the dielectric layer and the electrically-conductive polymer layer, and make the two layers easy to delaminate. By contrast, in the case of the embodiment, the manganese is introduced to dielectric layer 4 by forming the manganese dioxide layer on the surface of dielectric layer 4, and subsequently by removing the manganese dioxide layer therefrom. In the case where the niobium oxide is used as the material for dielectric layer 4, the formation of the manganese dioxide layer thereon evens out the vicinity of the surface of dielectric layer 4 by filling the micro-pits (or microscopic concave portions) with the respective parts of the manganese dioxide layer, and accordingly increasing the contact area between dielectric layer 4 and electrically-conductive polymer layer 5. This checks the delamination between dielectric layer 4 and electrically-conductive polymer layer 5, and accordingly decreases the deterioration of the electrostatic capacitance of the solid electrolytic capacitor.

As described above, the embodiments provide a solid electrolytic capacitor that is capable of keeping its electrostatic capacitance from deteriorating, and a method of manufacturing the solid electrolytic capacitor.

It should be noted that the scope of the present invention is not limited to the foregoing embodiment, and that various modifications including design changes are applicable to the present invention on the basis of knowledge which those skilled in the art have, as well as embodiments obtained by applying such modifications to the present invention should be also included in the scope of the present invention.

In the foregoing embodiment, the niobium, the niobium oxide and the tantalum are used as the material for the anode. However, the present invention does not limit the material for the anode to the niobium, the niobium oxide and the tantalum. For example, as long as any one of valve metals or an ally of at least two of the valve metals is used as the material for the anode, it is possible to obtain its corresponding effect by introducing the manganese to the surface of the dielectric layer that is closer to the cathode, the dielectric layer being formed on the surface of the anode body.

In the foregoing embodiment, the manganese concentration is designed to be at its maximum in the interface between the dielectric layer and the electrically-conductive polymer layer, and the overall manganese concentration distributes in the half of the dielectric layer that is closer to the electrically-conductive polymer layer. However, the present invention does not limit the location where the manganese concentration distributes to the half of the dielectric layer which is close to the electrically-conductive polymer layer, or the location where the manganese concentration is at its maximum to the interface between the dielectric layer and the electrically-conductive polymer layer. For example, only part of the manganese concentration may distribute in the half of the dielectric layer that is closer to the electrically-conductive polymer layer. In this case, the foregoing effects can be brought about in a part of the dielectric layer in which an area where the manganese concentration is at its maximum throughout its distribution is located.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor comprising:
   an anode including a valve metal;
   a cathode including an electrically-conductive polymer layer; and
   a dielectric layer between the anode and the cathode, the dielectric layer directly contacting the electrically-conductive polymer layer,
   wherein the dielectric layer is formed of a dielectric including an oxide of the valve metal and contains the valve metal, oxygen, and manganese in a vicinity of the surface of the dielectric layer that is closer to the cathode and, the manganese distributed with a concentration gradient in which the manganese concentration gets higher towards the vicinity of the surface of the dielectric layer that is closer to the cathode, and
   wherein the manganese concentration is at its maximum in the interface between the dielectric layer and the electrically-conductive polymer layer inside the dielectric layer.

2. The solid electrolytic capacitor of claim 1,
   wherein the dielectric layer further contain fluorine, and
   the fluorine is at a greater concentration in the dielectric layer closer to the anode.

3. The solid electrolytic capacitor of claim 2,
   wherein the fluorine is present at least in an interface between the dielectric layer and the anode.

4. The solid electrolytic capacitor of claim 3,
   wherein the fluorine concentration is distributed in a depth direction of the dielectric layer, and
   the fluorine concentration is at a maximum in the interface between the dielectric layer and the anode inside the dielectric layer.

5. A method of manufacturing a solid electrolytic capacitor comprising:
   forming a dielectric layer by oxidizing a surface of an anode;
   farming an electrically-conductive polymer layer on the dielectric layer; and
   introducing manganese to a surface of a part of the dielectric layer that is closer to the electrically-conductive polymer layer,
   wherein the step of introducing the manganese is carried out between the dielectric layer forming step and the electrically-conductive polymer layer forming step, the manganese introducing step comprising:
   forming a manganese dioxide layer on a surface of the dielectric layer; and
   removing the manganese dioxide layer by steeping the manganese dioxide layer in an inorganic acid aqueous solution.

6. The method of claim 5,
   wherein the dielectric layer forming step further comprises:
   steeping the anode in an ammonium fluoride aqueous solution; and
   steeping the anode in a phosphoric acid aqueous solution.

* * * * *

UNITED STATES PATENT AND TRADEMARK OFFICE
CERTIFICATE OF CORRECTION

| | | |
|---|---|---|
| PATENT NO. | : 7,876,549 B2 | Page 1 of 1 |
| APPLICATION NO. | : 12/118783 | |
| DATED | : January 25, 2011 | |
| INVENTOR(S) | : Takashi Umemoto et al. | |

It is certified that error appears in the above-identified patent and that said Letters Patent is hereby corrected as shown below:

Title Page, item (75) should read:

(75) Inventors: Takashi Umemoto, Hirakata (JP);
Hiroshi Nonoue, Hirakata (JP)

Signed and Sealed this
Fifteenth Day of March, 2011

David J. Kappos
*Director of the United States Patent and Trademark Office*